United States Patent
Westergaard (10) Patent No.: US 8,915,709 B2
(45) Date of Patent: Dec. 23, 2014

(54) OPTICAL ANGLE OF ATTACK DETECTOR BASED ON LIGHT DETECTION AND RANGING (LIDAR) FOR CONTROL OF AN AERODYNAMIC SURFACE

(75) Inventor: Carsten Hein Westergaard, Houston, TX (US)

(73) Assignee: Vestas Wind Systems A/S, Aarhus N (DK)

( * ) Notice: Subject to any disclaimer, the term of this patent is extended or adjusted under 35 U.S.C. 154(b) by 1005 days.

(21) Appl. No.: 12/981,851

(22) Filed: Dec. 30, 2010

(65) Prior Publication Data

US 2012/0171036 A1 Jul. 5, 2012

(51) Int. Cl.
| | |
|---|---|
| *F01D 25/00* | (2006.01) |
| *G01S 17/58* | (2006.01) |
| *F03D 11/00* | (2006.01) |
| *G01S 7/481* | (2006.01) |
| *G01P 13/00* | (2006.01) |
| *G01S 17/88* | (2006.01) |
| *G01P 5/26* | (2006.01) |
| *G01S 17/10* | (2006.01) |
| *G01P 13/02* | (2006.01) |

(52) U.S. Cl.
CPC .................. *G01P 13/00* (2013.01); *G01S 17/58* (2013.01); *F03D 11/0091* (2013.01); *G01S 7/4814* (2013.01); *F05B 2270/328* (2013.01); *G01S 17/88* (2013.01); *G01P 5/26* (2013.01); *G01S 17/107* (2013.01); *Y02E 10/722* (2013.01); *G01P 13/025* (2013.01); *F05B 2270/804* (2013.01)
USPC ............................................. 416/1; 416/61

(58) Field of Classification Search
USPC ...................... 416/61, 35, 30, 25, 1
See application file for complete search history.

(56) References Cited

U.S. PATENT DOCUMENTS

| | | |
|---|---|---|
| 5,317,376 A | 5/1994 | Amzajerdian et al. |
| 7,324,016 B1 | 1/2008 | Milgram |

(Continued)

FOREIGN PATENT DOCUMENTS

| | | |
|---|---|---|
| DE | 102006041461 A1 | 3/2008 |
| EP | 0970308 B1 | 1/2000 |

(Continued)

OTHER PUBLICATIONS

"Laser Doppler Anemometry," <http://www.dantecdynamics.com/Default/aspx?ID=454>, retrieved Nov. 15, 2010.

(Continued)

*Primary Examiner* — Edward Look
*Assistant Examiner* — Maxime Adjagbe
(74) *Attorney, Agent, or Firm* — Patterson & Sheridan, LLP (57) ABSTRACT

Methods and apparatus for optically detecting an angle of attack for an airfoil using light detection and ranging (LIDAR). To determine the angle of attack, one or more light beam pulses may be emitted from the leading edge of the airfoil into an (apparently) flowing fluid at various emission angles. The emitted pulses may be backscattered by particles in the fluid, and the backscattered light may be received by a detector at the airfoil. By range gating the returning pulses of backscattered light, a fluid velocity may be determined for each of the emission angles. The angle of attack is identified as the emission angle corresponding to the maximum velocity. A parameter (e.g., pitch or speed) of the airfoil may be controlled based on the angle of attack. In this manner, the airfoil may be manipulated or the shape of the airfoil may be adjusted for increased performance or efficiency.

39 Claims, 7 Drawing Sheets

(56) References Cited

U.S. PATENT DOCUMENTS

| | | |
|---|---|---|
| 2006/0140764 A1 | 6/2006 | Smith et al. |
| 2009/0046289 A1 | 2/2009 | Caldwell et al. |
| 2009/0074574 A1 | 3/2009 | Godsk et al. |

FOREIGN PATENT DOCUMENTS

| | | |
|---|---|---|
| EP | 1460266 A2 | 9/2004 |
| GB | 2428748 A | 2/2007 |
| GB | 2440954 A | 2/2008 |
| JP | 11125171 A | 5/1999 |
| WO | 2004074681 A1 | 9/2004 |
| WO | 2009143848 A2 | 12/2009 |
| WO | 2009143849 A2 | 12/2009 |
| WO | 2009143850 A2 | 12/2009 |
| WO | 2010106322 A2 | 9/2010 |

OTHER PUBLICATIONS

Mikkelsen et al., "LIDAR Wind Speed Measurements from a Rotating Spinner," EWEC Proceedings, Europe's Premier Wind Energy Event, Warsaw, Poland, Apr. 2010: pp. 1-8.

PCT International Search Report and Written Opinion dated Mar. 30, 2012 for PCT/DK2011/050499.

OPTICAL ANGLE OF ATTACK DETECTOR BASED ON LIGHT DETECTION AND RANGING (LIDAR) FOR CONTROL OF AN AERODYNAMIC SURFACE

BACKGROUND OF THE INVENTION

1. Field of the Invention

Embodiments of the invention generally relate to airfoils and, more particularly, to optically determining an angle of attack using light detection and ranging (LIDAR).

2. Description of the Related Art

In modern high performance aero-elastic machines, such as wind turbines or high performance aircraft, it is becoming increasingly important to control the aerodynamic forces in conjunction with the aero-elastic response through active manipulation. Such control may be accomplished not only by aerodynamic means (e.g., adjusting an angle of one or more flaps on a profile section of either a wind turbine blade or an airplane wing), but also by, for example, controlling the pitch of the blade or the rotational speed of the wind turbine rotor.

In state of the art controls, sensory signals are often generated from a structure's deflection properties by strain gauges, displacement sensors, or accelerometers. Although these are robust methods, these signals are filtered to the natural response frequencies for the structure, which are orders of magnitude slower than the aerodynamic response. As the control methods become more and more sophisticated, the demand for real-time understanding of the input forces may lead to substantial improvements to the control strategies and their impact on managing the structure.

SUMMARY OF THE INVENTION

Embodiments of the invention generally relate to methods and apparatus for determining an angle of attack using light detection and ranging (LIDAR) in an effort to precisely control an aerodynamic surface in an aero-elastic response system.

One embodiment of the present invention provides a method of determining an angle of attack for an airfoil in a flowing fluid, wherein the angle of attack is an angle between a flow direction of the fluid and a chord of the airfoil. The method generally includes emitting a light beam from a leading edge of the airfoil into the fluid at an emission angle, wherein the light beam is backscattered by particles in the fluid, receiving a portion of the backscattered light at the emission angle, and determining the angle of attack for the airfoil based on the received portion of the backscattered light.

Another embodiment of the present invention provides a system. The system generally includes an airfoil and at least one processor. The airfoil typically includes a light emitter configured to emit a light beam from a leading edge of the airfoil into a flowing fluid at an emission angle, wherein the light beam is backscattered by particles in the fluid, and an optical receiver configured to receive a portion of the backscattered light at the emission angle. The processor is generally configured to determine an angle of attack for the airfoil based on the received portion of the backscattered light, wherein the angle of attack is an angle between a flow direction of the fluid and a chord of the airfoil.

Yet another embodiment of the present invention provides a wind turbine generator. The wind turbine generator generally includes a tower, a nacelle coupled to the tower, a rotor comprising a plurality of blades and configured to turn a shaft partially disposed in the nacelle when wind pushes on the blades, and at least one processor. The at least one of the blades typically includes a light emitter configured to emit a light beam from a leading edge of the at least one of the blades into the wind at an emission angle, wherein the light beam is backscattered by particles in the wind; and an optical receiver configured to receive a portion of the backscattered light at the emission angle. The at least one processor is configured to determine an angle of attack for the at least one of the blades based on the received portion of the backscattered light, wherein the angle of attack is an angle between a direction of the wind and a chord of the at least one of the blades.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques and apparatus for optically detecting an angle of attack for an airfoil using light detection and ranging (LIDAR). To determine the angle of attack, one or more light beam pulses are emitted from the leading edge of the airfoil into an (apparently) flowing fluid at various emission angles. The emitted pulses may be backscattered by particles in the fluid, and the backscattered light may be received by a detector at the airfoil. By range gating the returning pulses of backscattered light, a fluid velocity may be determined for each of the emission angles. The angle of attack is identified as the emission angle corresponding to the maximum velocity of the fluid. A parameter (e.g., pitch or speed) of the airfoil may be controlled based on the angle of attack. In this manner, the airfoil may be moved or the shape of the airfoil may be adjusted for increased performance or increased efficiency.

As used herein, an airfoil generally refers to a shaped surface designed to develop a desired force by reaction with a fluid flowing across the surface. The fluid flow may be caused by movement of the fluid itself or be an apparent fluid flow due to movement of the airfoil through the fluid. Although embodiments of the invention mainly refer to a rotor blade of a wind turbine generator as the airfoil, the concepts described herein may be applied to any airfoil. Examples of other airfoils include an aircraft wing, a helicopter rotor blade, a propeller blade for a ship or airplane, a hydropower turbine blade, or a sail.

An Example Wind Turbine Generator

Figure 1:
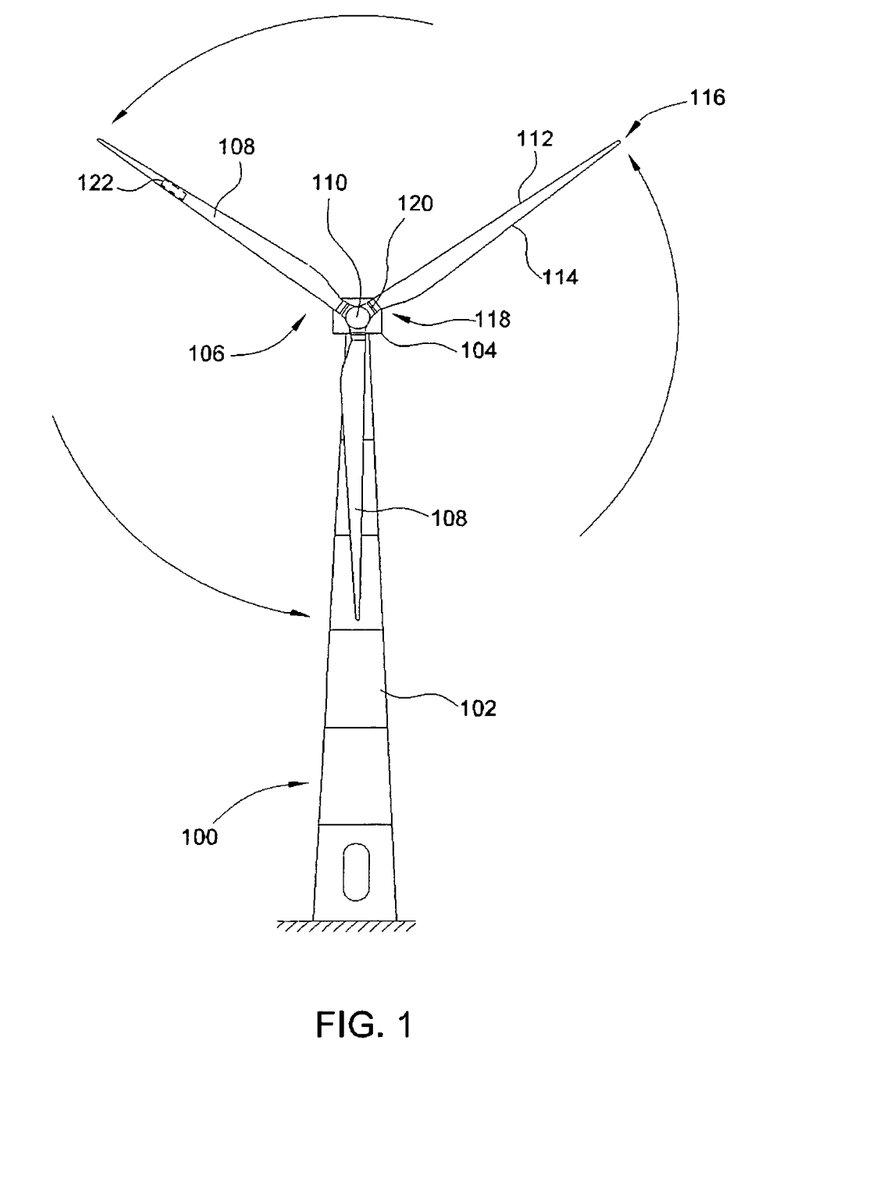
FIG. 1 illustrates a diagrammatic view of a wind turbine generator, according to an embodiment of the invention.

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. As shown, the wind turbine rotor 106 comprises three rotor blades 108 mounted on a common hub 110, but may comprise any suitable number of blades, such as one, two, four, five, or more blades. As an airfoil driven by the force of the wind, the blade 108 typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected with the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade.

Figure 2:
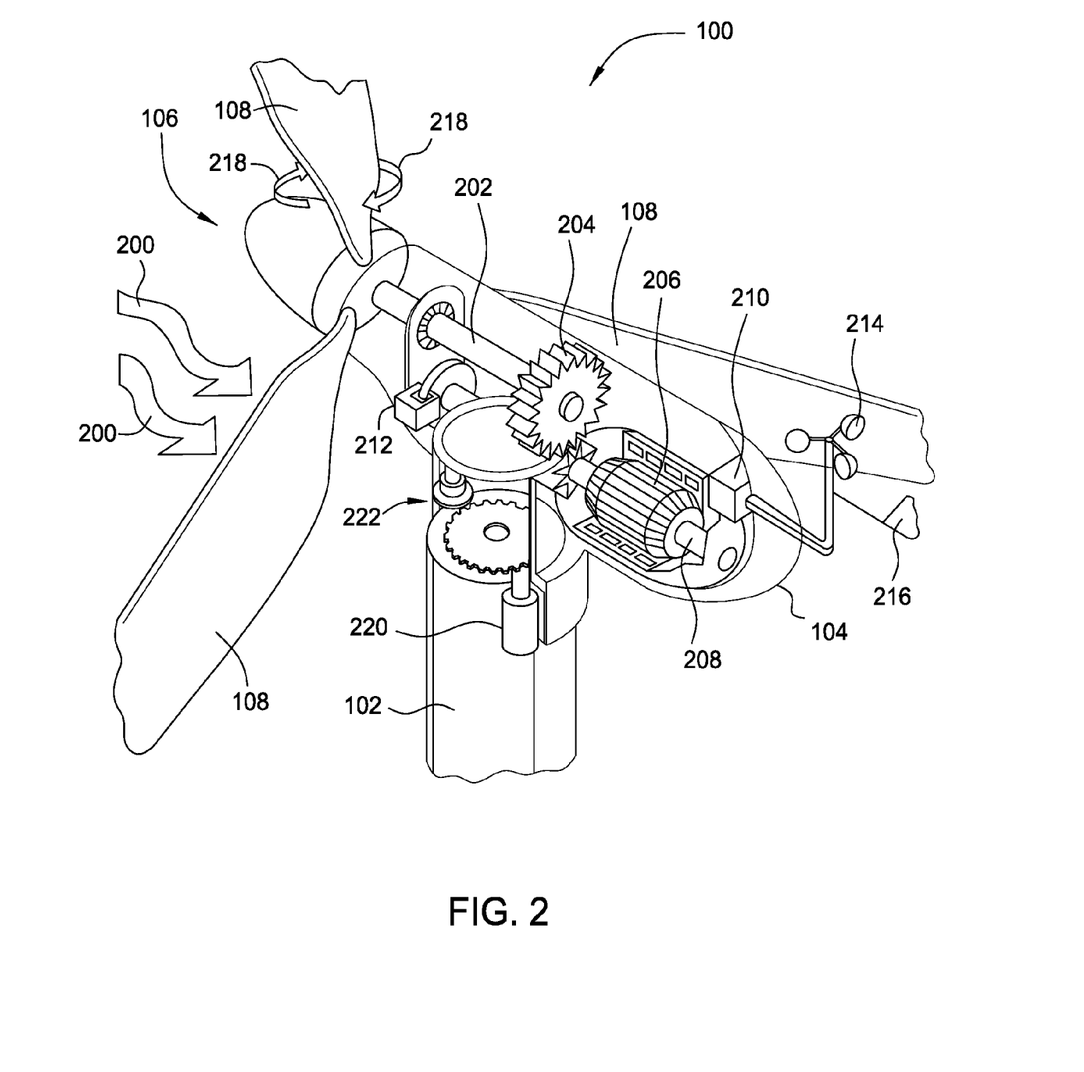
FIG. 2 illustrates a diagrammatic view of the components internal to the nacelle and tower of a wind turbine generator, according to an embodiment of the invention.

FIG. 2 illustrates a diagrammatic view of typical components internal to the nacelle 104 and tower 102 of a wind turbine generator 100. When the wind 200 pushes on the blades 108, the rotor 106 spins, thereby rotating a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106, in turn. The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Example Angle of Attack Detection

In order to increase efficiency (e.g., energy conversion efficiency) or performance (e.g., speed) associated with an airfoil, it is important to know the angle of attack for the airfoil in the flowing fluid. By knowing the angle of attack and the fluid flow velocity, the forces acting upon the airfoil can be determined by a look-up table, for example, which provides the coefficients of lift, drag, and pitching moment.

Figure 3:
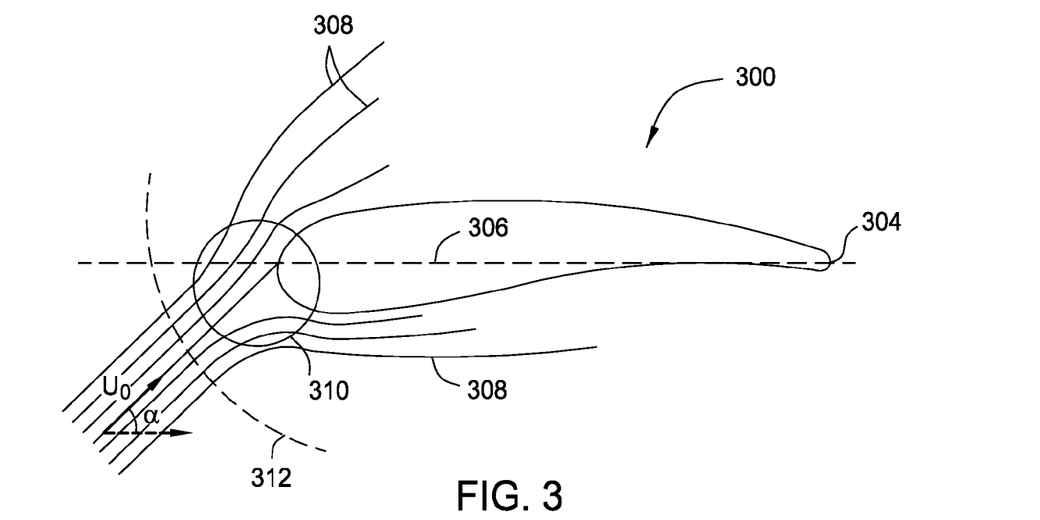
FIG. 3 illustrates an airfoil and the angle of attack for the airfoil, according to an embodiment of the invention.

FIG. 3 illustrates an airfoil 300 in cross-section and the angle of attack (α) for the airfoil. The mean camber line (not shown) of an airfoil is the locus of points halfway between the upper and lower surfaces of the airfoil as measured perpendicular to the mean camber line itself. The leading edge 302 is the most forward point of the mean camber line, while the trailing edge 304 is the most rearward point. The straight line connecting the leading edge 302 to the trailing edge 304 is the chord 306 of the airfoil. As used herein, the leading edge 302 generally refers to the area of the airfoil surface around the most forward point of the mean camber line, rather than the exact point at one end of the chord 306. The angle of attack (α) for the airfoil generally refers to the angle between the apparent flow direction (also known as the relative flow direction) of the fluid and a reference line. For purposes of the present description, the chord 306 of the airfoil will be used as the reference line, although other appropriate references can be used. For example, if the airfoil 300 is moving in a flowing fluid, such as wind, then the angle of attack refers to the angle between the apparent wind (also known as the relative wind) and the chord 306 of the airfoil.

The nominal flow velocity of the fluid is depicted in FIG. 3 as a vector $\vec{U}_0$. However, the airfoil disturbs the flowing fluid, as shown by the streamlines 308 in FIG. 3. Near the leading edge 302 of the airfoil 300 (e.g., in area 310), the direction of the flow velocity may be different than the nominal flow direction of $\vec{U}_0$. Therefore, the angle of attack may be inaccurate if measured within arc 312 at a certain radius from the leading edge 302.

For example, a laser Doppler anemometer (LDA)—also known as a laser Doppler velocimeter (LDV)—simultaneously emits two laser beams focused by a lens such that the two beams intersect at a region called the measurement volume. At the measurement volume, the interference of the laser beams creates of set of equally spaced fringes that are parallel to the bisector of the beams. When particles suspended by the fluid pass through the fringes, light is scattered by an amount that fluctuates as the particles travel through the fringes. The frequency of the fluctuation (the Doppler shift) is thus proportional to the velocity of the particle normal to the fringes, such that the absolute magnitude and direction of the particle's velocity (and thus, the fluid) in the plane that the two beams span may be derived.

However, because the distance between the fringes (i.e., the fringe distance $d_f$) is a function of the laser beam wavelength and the angle between the beams, a major drawback of the LDA solution is that a relatively large angle between the two beams is required in order to obtain a result. Such a large angle typically demands a large window (or aperture), which may disturb the airflow around the surface and increase vulnerability of the system. As described above with respect to FIG. 3, there are relatively large changes in the direction of the fluid flow close to the airfoil 300. Therefore, the use of data from the LDA may require prior knowledge of the flow field around the airfoil, such that the LDA may not function as a standalone instrument for measuring the flow velocity (and the angle of attack).

Accordingly, what is needed are techniques and apparatus for accurately detecting an angle of attack for an airfoil without needing prior knowledge of the flow field around the airfoil. Ideally, these techniques and apparatus should not disturb the fluid flow around the airfoil, and a small window is advantageous.

By using light detection and ranging (LIDAR) where a light beam is emitted into a flowing fluid, backscattered by particles in the fluid, and a portion of the backscattered light is received at the same emission angle (such that the light beam is emitted and received along a single line), an angle of attack for an airfoil may be optically detected by using various emission angles. For this type of LIDAR (known as elastic backscatter LIDAR), the transmitted wavelength of the transmitted light beam may be substantially equal to a backscattered wavelength of the backscattered light, as opposed to the Doppler shifted wavelengths in the LDA solution.

Fundamentally, one or multiple laser beams are emitted from the leading edge 302 of the airfoil 300. By either scanning of the angular direction in relation to the chord 306 or by detecting from multiple directions, the direction of the maximum head velocity may be determined. The maximum head velocity corresponds to a no-cross-flow situation across the emitted laser beam (i.e., a situation in which the fluid flow vector and a vector for the backscattered light at the emission angle lie along the same line, in contrast with a cross-flow situation where the fluid flow vector and the backscattered light vector at the emission angle intersect), thereby indicating the angle of attack.

Figure 4:
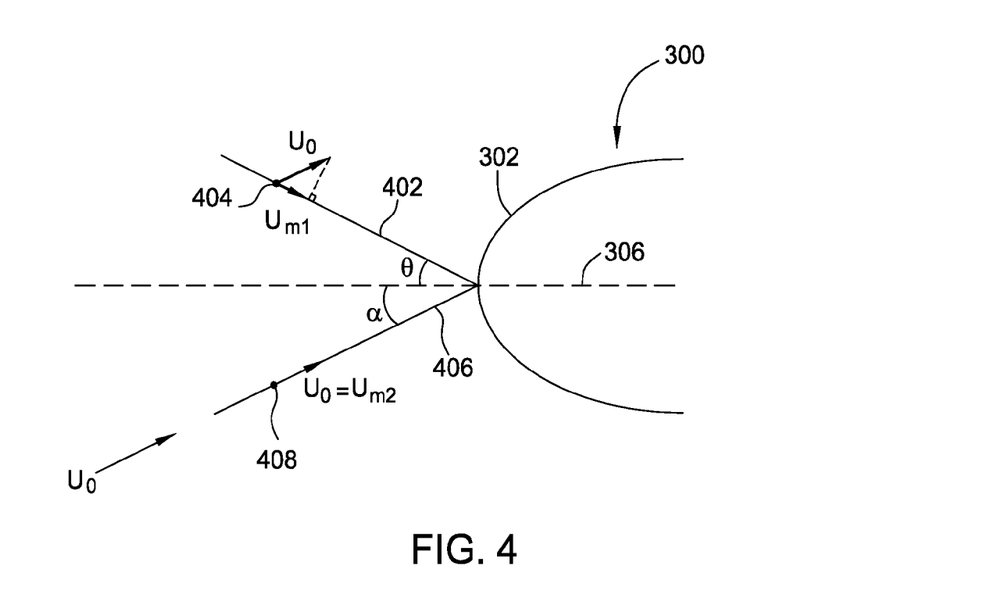
FIG. 4 illustrates two laser beams emitted at different angles from the leading edge of an airfoil to depict why the angle of attack corresponds to the maximum velocity, according to an embodiment of the invention.

FIG. 4 illustrates two laser beams emitted either sequentially or simultaneously at different emission angles from the leading edge 302 of an airfoil 300 to depict why the angle of attack corresponds to the maximum velocity. When a first laser beam 402 is emitted from the leading edge 302 at an emission angle δ with respect to the chord 306 and is backscattered from a particle 404 traveling at $\vec{U}_0$ with the speed and direction of the flowing fluid, the magnitude of the backscattered portion of the light received at the emission angle δ indicates a first measured flow velocity $\vec{U}_{m1}$. When a second laser beam 406 is emitted from the leading edge 302 at an emission angle equal to the angle of attack (α) and is backscattered from a particle 408 traveling at $\vec{U}_0$ with the speed and direction of the flowing fluid, the magnitude of the backscattered portion of the light received at the emission angle α is at a maximum and indicates a second measured flow velocity $\vec{U}_{m2}=\vec{U}_0$. In other words, the magnitude of the backscattered portion at the emission angle θ is lower than the magnitude of the backscattered portion at the angle of attack α due to the cross flow of the traveling particle.

Figure 5:
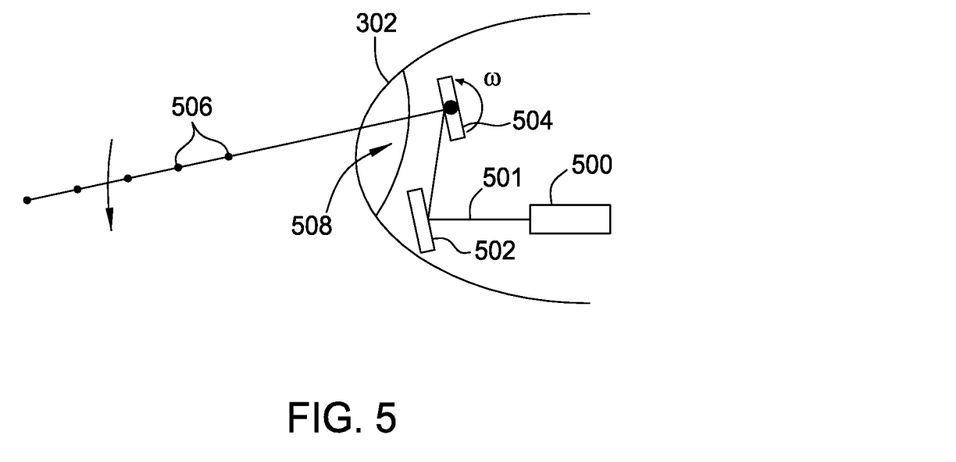
FIG. 5 illustrates using a mirror to sequentially emit the light beam at different emission angles from the leading edge of the airfoil in an effort to effectuate a sweep, according to an embodiment of the invention.

Referring now to FIG. 5, a light emitter 500, such as a laser diode or other source of laser beam emission, may emit a light beam 501 for emission from the leading edge 302 (or close to the leading edge if not the exact most forward point on the mean camber line) of the airfoil 300. The light beam 501 may be reflected from a mirror 502 to a scanning mirror 504 configured to rotate such that light may be sequentially emitted from the leading edge 302 at different emission angles as the scanning mirror 504 is rotated. By steering the light beam 501 in this manner, a sweep may be effectuated for determining the angle of attack. The light beam may be emitted as a one or more light pulses at each of the emission angles, and range gating may be used to detect backscatter from particles at different detection points 506 in the fluid.

For some embodiments, the light emitter 500 (and the optical receiver) are located inside the airfoil 300 to avoid disturbing the flowing fluid. The light emission may occur through a transparent window 508 located at the leading edge 302. Preferably, the window 508 does not disturb (or minimally disturbs) the fluid flow around the airfoil.

Figure 6:
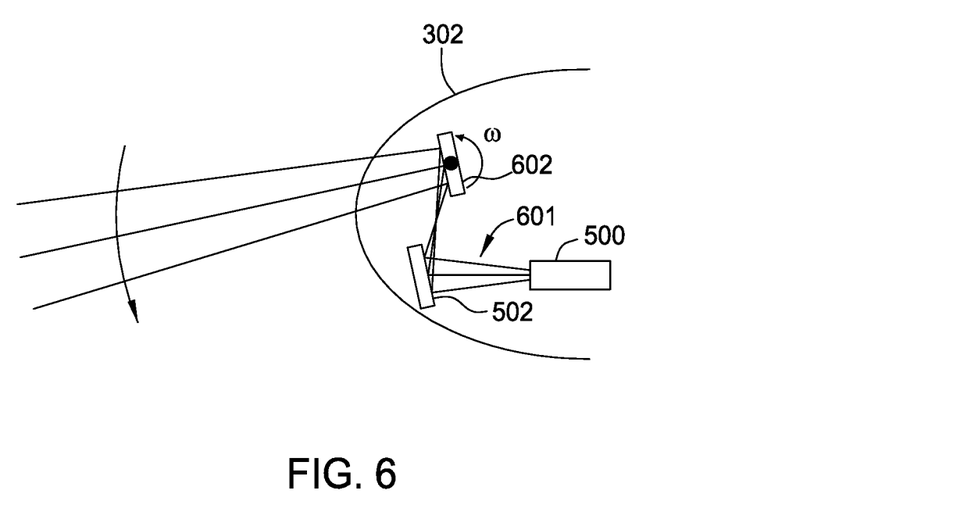
FIG. 6 illustrates multiple light beams being scanned using a sweeping mirror, according to an embodiment of the invention.

Similar to the embodiment in FIG. 5, FIG. 6 illustrates multiple light beams 601 being scanned using a sweeping mirror 602, according to another embodiment of the invention. The sweeping mirror 602 in FIG. 6 may function similar to the scanning mirror 504 in FIG. 5, rotating to effectuate a sweep at different emission angles. However, in this embodiment, the testing of different emission angles to determine the angle of attack occurs both simultaneously (by using multiple beams emitted at different angles) and sequentially (by adjusting the sweeping mirror 602 to achieve a new set of emission angles for the multiple beams). By doing this, the angle of attack may be determined more quickly and accurately than the embodiment of FIG. 5, or more emission angles may be tested in the same amount of time as a sweep in the embodiment of FIG. 5 for a more precise and accurate determination.

Figure 7:
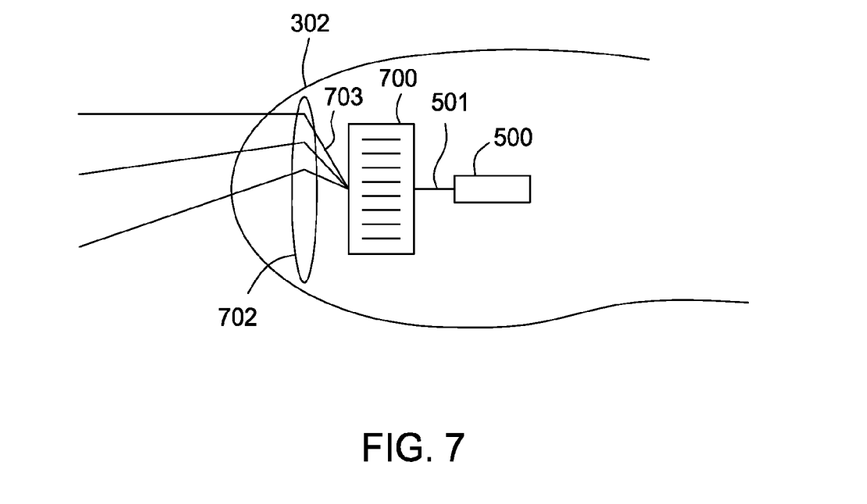
FIG. 7 illustrates using an acousto-optic modulator (AOM) to emit the light beam at different emission angles from the leading edge of the airfoil to electro-optically effectuate a sweep, according to an embodiment of the invention.

FIG. 7 illustrates using an acousto-optic modulator (AOM) 700, such as a Bragg cell, to emit the light beam at different emission angles from the leading edge 302 of the airfoil 300 to electro-optically effectuate a sweep, according to an embodiment of the invention. An AOM uses the acousto-optic effect to diffract and shift the frequency of the incoming light beam 501 using sound waves (usually at radio frequency). A lens 702 may be used to refract a diffracted light beam 703 received from the AOM to generate different emission angles. One advantage of this embodiment is the lack of moving parts compared to other embodiments, such as those described with respect to FIGS. 5 and 6.

Figure 8:
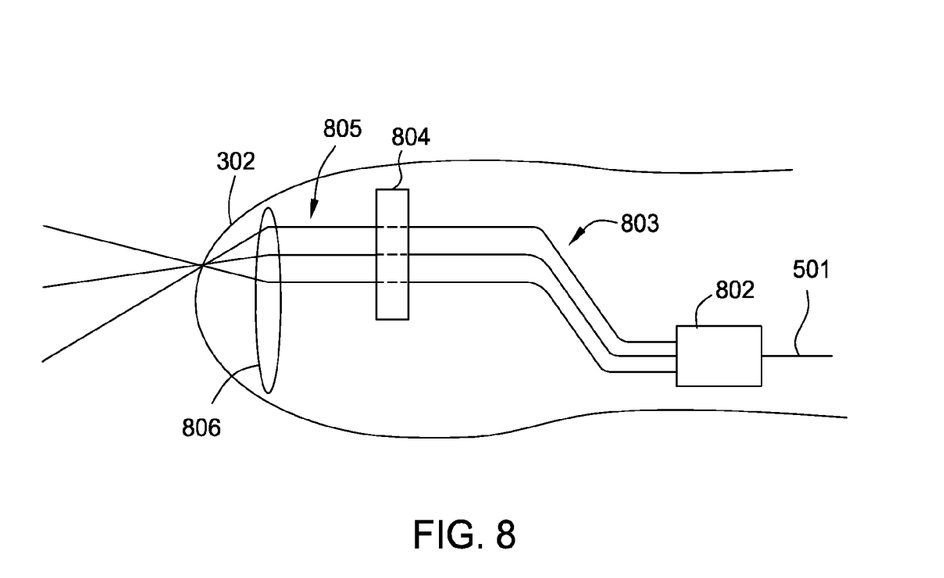
FIG. 8 illustrates using an optical multiplexer to generate multiple beams for emission at different angles from the leading edge of the airfoil, according to an embodiment of the invention.

FIG. 8 illustrates using an optical multiplexer 802 to generate multiple beams for emission at different angles from the leading edge 302 of the airfoil 300, according to an embodiment of the invention. The optical multiplexer 802 may create multiple beams at different wavelengths, which are routed via optical fibers 803 to a termination 804 for emitting a light beam from each of the optical fibers. The light beams 805 may be refracted by a lens 806 to generate different emission angles. This embodiment not only eliminates moving parts, but also allows for separating at least a portion of the emission system (e.g., the light emitter 500 and the optical multiplexer 802) from the leading edge 302. For example, this portion of the emission system may be disposed in the root 118 of the wind turbine blade 108, whereas the optical fibers 803 may be routed in the blade to a remaining portion of the emission system (e.g., the termination 804 and the lens 806) disposed near the leading edge 302. In this manner, the portion of the emission system disposed in the root may be more easily serviced.

Figure 9:
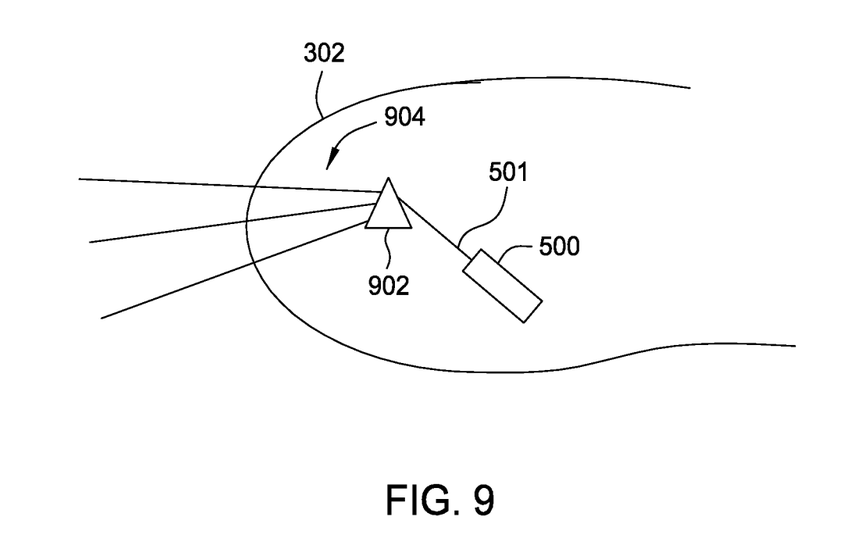
FIG. 9 illustrates using a prism to separate a light beam into a plurality of light beams having different wavelengths and emitted from the leading edge of the airfoil at different angles, according to an embodiment of the invention.

FIG. 9 illustrates using a prism 902 to separate a light beam 501 into a plurality of light beams 904 having different wavelengths and emitted from the leading edge 302 of the airfoil 300 at different angles, according to an embodiment of the invention. In this manner, multiple light beams are simultaneously emitted at different emission angles in order to detect the angle of attack. This embodiment also offers the advantage of having no moving parts in the emission system.

Figure 10:
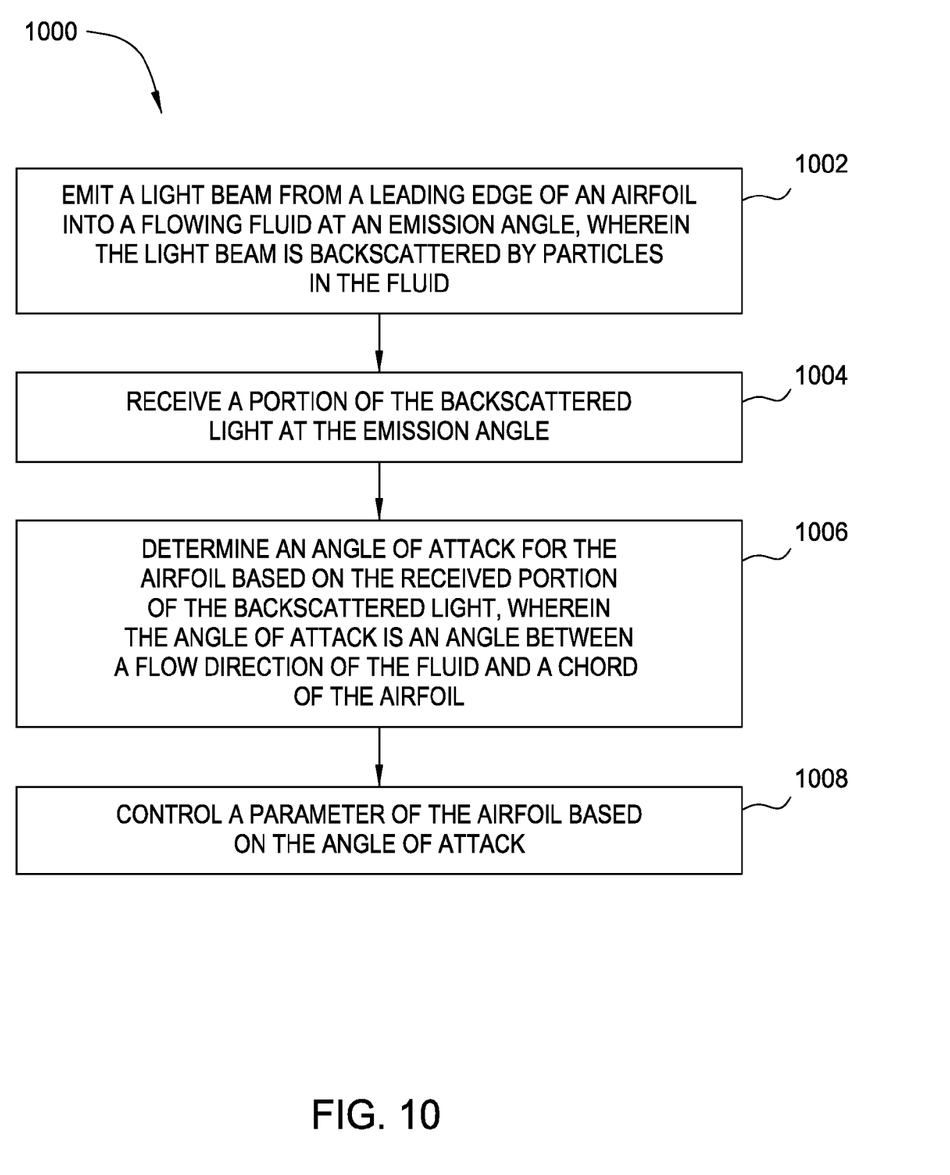
FIG. 10 is a flow diagram of exemplary operations for determining an angle of attack for an airfoil in a flowing fluid, according to an embodiment of the invention.

FIG. 10 is a flow diagram of exemplary operations 1000 for determining an angle of attack for an airfoil in a flowing fluid, according to an embodiment of the invention. The operations 1000 may be performed by a wind turbine generator, for example. The operations 1000 may begin, at 1002, by emitting a light beam from the leading edge of the airfoil into the flowing fluid at an emission angle. The emitted light beam may be backscattered by particles in the fluid (e.g., by dust and/or water droplets entrained in air). At 1004, a portion of the backscattered light may be received at the emission angle. This reception may be performed by a photodetector or a photomultiplier, for example. For some embodiments, one or more pulses of the light beam may be emitted sequentially (or pulses from multiple light beams may be emitted simultaneously) at a plurality of different emission angles. For such embodiments, the portion of the backscattered light pulses may be received at each of the emission angles.

The angle of attack ($\alpha$) for the airfoil may be determined at 1006 based on the received portion of the backscattered light, wherein the angle of attack is an angle between a flow direction of the fluid and a chord of the airfoil corresponding to the leading edge. For some embodiments using light pulses emitted at a plurality of emission angles, the angle of attack may be determined by determining a velocity of the fluid for each of the emission angles based on range gating of the received backscattered light pulses at each of the emission angles. In these embodiments, the angle of attack may be considered and identified as one of the emission angles at which the velocity of the fluid is a maximum.

Once the angle of attack is known, together with the velocity, the forces acting upon the airfoil may be determined by using a look-up table, for example, which describes the coefficients of lift, drag, and pitching moment. For some embodiments, a parameter of the airfoil may be controlled at 1008 based on the angle of attack in an effort to increase efficiency or performance or, in some cases, reduce acoustic noise. The parameter may include the pitch, speed, or shape of the airfoil, for example. For example, if the airfoil is a blade 108 of a wind turbine generator, the pitch 218 may be adjusted, the speed of the rotor 106 (and thus, the blades 108) may be altered using the braking system 212, or the shape of the blade 108 may be changed by moving one or more flaps on the trailing edge 114 of the blade 108.

By either placing any of the LIDAR systems described herein at a strategic location in the airfoil (e.g., in a blade 108 at approximately ⅔ of the radius from the rotor 106) or by having multiple LIDAR systems described herein along the leading edge 302, the knowledge of the aerodynamic forces acting upon the airfoil may be routed to one or more processors, such as a system controller. For some embodiments, a first processor 122 (see FIG. 1) for determining the angle of attack may be located in the blade 108 or another portion of the rotor 106, while a second processor for controlling the parameter of the blade 108 based on the angle of attack may be located in the nacelle 104. Combined with a modal state determination (e.g., blade root deflection and tower deflection), the aerodynamic force determination is key and may provide the best possible input to the controller (e.g., controller 210) for making adjustments with respect to pitch, speed, shape of the airfoil(s), etc.

Although LIDAR based on backscattering from particles suspended in a fluid is described above, embodiments of the invention may be based on backscatter of light from other physical phenomena. These may include, for example, temperature gradients or pressure gradients in the flowing fluid.

CONCLUSION

Embodiments of the present invention provide various suitable techniques and apparatus for optically detecting an angle of attack for an airfoil using LIDAR. Such techniques provide a non-intrusive optical method that avoids disturbing the fluid flow, which could lead to inaccurate measurements, inefficiency, or performance degradation. Therefore, the optical techniques described herein may provide advantages over current intrusive techniques using a 5-hole pitot tube, a wind vane, and the like. Furthermore, embodiments of the invention may employ fiber optics to launch and receive the measurements, thereby eliminating or reducing electronics in the airfoil for this purpose.

While the foregoing is directed to embodiments of the present invention, other and further embodiments of the invention may be devised without departing from the basic scope thereof, and the scope thereof is determined by the claims that follow.

What is claimed is:

1. A method of determining an angle of attack for an airfoil in a flowing fluid, wherein an angle of attack is an angle between a flow direction of the flowing fluid and a chord of the airfoil, the method comprising:
   emitting a light beam from a leading edge of the airfoil into the flowing fluid at an emission angle, wherein the light beam is backscattered by particles in the flowing fluid as backscattered light;
   receiving a portion of the backscattered light at the emission angle; and
   determining the angle of attack for the airfoil as the emission angle at which a maximum velocity occurs based on the received portion of the backscattered light,
   wherein the maximum velocity is greater than or equal to a determined velocity.

2. The method of claim 1, wherein emitting the light beam comprises emitting the light beam at a plurality of emission angles and
   wherein receiving the portion of the backscattered light comprises receiving the portion of the backscattered light at each of the plurality of emission angles, wherein the plurality of emission angles includes the emission angle.

3. The method of claim 2, wherein emitting the light beam comprises sequentially emitting the light beam at the plurality of emission angles.

4. The method of claim 2, wherein emitting the light beam comprises steering the light beam by adjusting a mirror.

5. The method of claim 2, wherein emitting the light beam comprises using a prism to separate the light beam into a plurality of light beams having different wavelengths and emitted at the plurality of emission angles.

6. The method of claim 2, wherein emitting the light beam comprises using an acousto-optic modulator (AOM) to diffract the light beam for emission at the plurality of emission angles.

7. The method of claim 2, further comprising emitting a pulse of the light beam at each of the emission angles from the leading edge of the airfoil into the flowing fluid, wherein the pulse of the light beam is backscattered by the particles in the flowing fluid.

8. The method of claim 7,
   wherein receiving the portion of the light beam as the backscattered light comprises receiving the portion of the backscattered pulse at each of the plurality of emission angles, and
   wherein determining the angle of attack comprises:
      determining a velocity of the flowing fluid for each of the plurality of emission angles based on range gating of the received backscattered pulse at each of the plurality of emission angles; and identifying the angle of attack as one of the plurality of emission angles at which the velocity of the flowing fluid is a maximum.

9. The method of claim 1, wherein emitting the light beam comprises emitting the light beam into the flowing fluid via a window disposed in the leading edge of the airfoil.

10. The method of claim 1, wherein the flowing fluid is an apparently flowing fluid and wherein the flow direction is a relative flow direction.

11. The method of claim 1, further comprising controlling a parameter of the airfoil based on the angle of attack.

12. The method of claim 11, wherein the parameter comprises at least one of: a pitch, a speed, or a shape of the airfoil.

13. The method of claim 1, wherein the airfoil comprises one of: a rotor blade of a wind turbine generator, an aircraft wing, a propeller blade, a sail, a helicopter rotor blade, and a hydropower turbine blade.

14. The method of claim 1, wherein the flowing fluid comprises air, and the particles comprise dust or water droplets entrained in the air.

15. The method of claim 1,
wherein the emitting the light beam comprises emitting the light beam from the leading edge of the airfoil into the flowing fluid at a plurality of emission angles, and the plurality of emission angles includes the emission angle;
wherein the receiving the portion of the backscattered light comprises receiving portions of the backscattered light at respective ones of the plurality of emission angles, and the portions include the portion of the backscattered light; and
wherein the determining the angle of attack comprises determining the angle of attack for the airfoil based on the received portions of the backscattered light by determining the angle of attack for the airfoil based on the received portions of the backscattered light, by determining a velocity of the flowing fluid for each of the plurality of emission angles, and identifying the angle of attack as one of the plurality of emission angles at which the maximum velocity of the fluid is a maximum.

16. A system, comprising:
an airfoil comprising:
a light emitter configured to emit a light beam from a leading edge of the airfoil into a flowing fluid at an emission angle, wherein the light beam is backscattered by particles in the flowing fluid as backscattered light; and
an optical receiver configured to receive a portion of the backscattered light at the emission angle; and
at least one processor configured to determine an angle of attack for the airfoil as the emission angle at which a maximum velocity occurs based on the received portion of the backscattered light, wherein the angle of attack is an angle between a flow direction of the flowing fluid and a chord of the airfoil,
wherein the maximum velocity is greater than or equal to a determined velocity.

17. The system of claim 16, wherein the at least one processor is configured to determine the angle of attack by identifying one of a plurality of emission angles corresponding to a maximum velocity of the flowing fluid.

18. The system of claim 16, wherein the light emitter comprises a laser diode.

19. The system of claim 16, wherein the optical receiver comprises a photodetector or a photomultiplier.

20. The system of claim 16, wherein the light emitter is configured to emit the light beam at a plurality of emission angles and wherein the optical receiver is configured to receive the portion of the backscattered light at each of the plurality of emission angles.

21. The system of claim 20, further comprising a mirror configured to steer the light beam for emission at the plurality of emission angles.

22. The system of claim 20, further comprising a prism to separate the light beam into a plurality of light beams having different wavelengths for emission at the plurality of emission angles.

23. The system of claim 20, further comprising an acousto-optic modulator (AOM) to diffract the light beam for emission at the plurality of emission angles.

24. The system of claim 16, further comprising a window disposed in the leading edge of the airfoil and configured to pass the light beam emitted from the leading edge of the airfoil into the flowing fluid.

25. The system of claim 16, wherein the airfoil comprises one of: a rotor blade of a wind turbine generator, an aircraft wing, a propeller blade, a sail, a helicopter rotor blade, and a hydropower turbine blade.

26. The system of claim 16, wherein the at least one processor is configured to control a parameter of the airfoil based on the angle of attack.

27. The system of claim 26, wherein the parameter comprises at least one of: a pitch, a speed, or a shape of the airfoil.

28. The system of claim 16, wherein the light emitter and the optical receiver are located inside the airfoil.

29. The system of claim 16, wherein the airfoil comprises a blade for a rotor of a wind turbine generator, wherein the at least one processor comprises:
a first processor configured to determine the angle of attack and a second processor configured to control a parameter of the blade based on the angle of attack,
wherein the second processor is located in a nacelle of the wind turbine generator.

30. The system of claim 29, wherein the first processor is located in the blade or in another portion of the rotor of the wind turbine generator.

31. The system of claim 16, wherein the flowing fluid comprises air, and the particles comprise dust or water droplets entrained in the air.

32. The system of claim 16,
wherein the light emitter is further configured to emit the light beam from the leading edge of the airfoil into the flowing fluid at a plurality of emission angles, and the plurality of emission angles includes the emission angle;
wherein the optical receiver is further configured to receive portions of the backscattered light at respective ones of the plurality of emission angles, and the portions include the portion of the backscattered light; and
wherein the at least one processor is further configured to determine the angle of attack for the airfoil based on the received portions of the backscattered light by determining the angle of attack for the airfoil based on the received portions of the backscattered light, by determining a velocity of the flowing fluid for each of the plurality of emission angles, and identifying the angle of attack as one of the plurality of emission angles at which the maximum velocity of the fluid is a maximum.

33. A wind turbine generator, comprising:
a tower;
a nacelle coupled to the tower;
a rotor comprising a plurality of blades and configured to turn a shaft partially disposed in the nacelle when wind pushes on the plurality of blades, wherein at least one of the plurality of blades comprises:

a light emitter configured to emit a light beam from a leading edge of the at least one of the plurality of blades into the wind at an emission angle, wherein a portion of the light beam is backscattered by particles in the wind as backscattered light; and an optical receiver configured to receive a portion of the backscattered light at the emission angle; and at least one processor configured to determine an angle of attack for the at least one of the plurality of blades as the emission angle at which a maximum velocity occurs based on the received portion of the backscattered light, wherein the angle of attack is an angle between a direction of the wind and a chord of the at least one of the plurality of blades, and the maximum velocity is greater than or equal to a determined velocity.

34. The wind turbine generator of claim 33, wherein the at least one processor is configured to determine the angle of attack by identifying one of a plurality of emission angles corresponding to a maximum velocity of the wind,
wherein the plurality of emission angles includes the emission angle.

35. The wind turbine generator of claim 33, wherein the at least one processor is configured to control a parameter of the at least one of the plurality of blades based on the angle of attack.

36. The wind turbine generator of claim 35, wherein the parameter comprises at least one of: a pitch of the at least one of the plurality of blades, an angle of one or more flaps on the at least one of the plurality of blades, and a speed of the rotor.

37. The wind turbine generator of claim 33, wherein the at least one processor comprises:
a first processor configured to determine the angle of attack; and
a second processor configured to control a parameter of the at least one of the plurality of blades based on the angle of attack,
wherein the second processor is located in the nacelle.

38. The wind turbine generator of claim 37, wherein the first processor is located in the at least one of the plurality of blades or in another portion of the rotor.

39. The wind turbine generator of claim 33,
wherein the light emitter is further configured to emit the light beam from the leading edge of the airfoil into the flowing fluid at a plurality of emission angles, and the plurality of emission angles includes the emission angle;
wherein the optical receiver is further configured to receive portions of the backscattered light at respective ones of the plurality of emission angles, and the portions include the portion of the backscattered light; and
wherein the at least one processor is further configure to determine the angle of attack for the airfoil based on the received portions of the backscattered light by determining the angle of attack for the airfoil based on the received portions of the backscattered light, by determining a velocity of the flowing fluid for each of the plurality of emission angles, and identifying the angle of attack as one of the plurality of emission angles at which the maximum velocity of the fluid is a maximum.

* * * * *